United States Patent [19]
Smart et al.

[11] Patent Number: 5,840,193
[45] Date of Patent: Nov. 24, 1998

[54] FLUID EXTRACTION USING CARBON DIOXIDE AND ORGANOPHOSPHORUS CHELATING AGENTS

[75] Inventors: Neil G. Smart; Chien M. Wai; Yuehe Lin; Yak Hwa Kwang, all of Moscow, Id.

[73] Assignee: Idaho Research Foundation, Moscow, Id.

[21] Appl. No.: 686,422

[22] Filed: Jul. 26, 1996

[51] Int. Cl.$^6$ .............................. B01D 11/00; B01D 11/02
[52] U.S. Cl. .......................... 210/638; 210/634; 210/639
[58] Field of Search .................................... 210/634, 638, 210/639, 912; 423/21.1, 21.5, 8–10; 252/364

[56] References Cited

U.S. PATENT DOCUMENTS

| | | | |
|---|---|---|---|
| 4,275,039 | 6/1981 | Özensoy et al. | 423/54 |
| 4,464,251 | 8/1984 | Kukes et al. | 208/221 |
| 4,465,587 | 8/1984 | Garg et al. | 208/87 |
| 4,518,484 | 5/1985 | Mann et al. | 208/87 |
| 4,529,503 | 7/1985 | Kukes | 208/251 |
| 4,547,292 | 10/1985 | Zarchy | 210/634 |
| 4,563,213 | 1/1986 | Hubred | 75/119 |
| 4,895,905 | 1/1990 | Schneider et al. | 525/154 |
| 4,909,868 | 3/1990 | Melvin | 149/109 |
| 5,332,531 | 7/1994 | Horwitz et al. | 588/20 |
| 5,356,538 | 10/1994 | Wai et al. | 210/634 |
| 5,606,724 | 2/1997 | Wai et al. | 423/21.1 |
| 5,641,887 | 6/1997 | Beckman et al. | 210/634 |
| 5,730,874 | 3/1998 | Wai et al. . | |
| 5,770,085 | 6/1998 | Wai et al. . | |

FOREIGN PATENT DOCUMENTS

| | | |
|---|---|---|
| PCT/US94/06450 | 6/1994 | European Pat. Off. . |
| PCT/US95/06938 | 6/1995 | European Pat. Off. . |
| WO91/04945 | 4/1991 | WIPO . |
| WO95/28999 | 11/1995 | WIPO . |

OTHER PUBLICATIONS

International Search Report for PCT/US97/13139, dated Oct. 24, 1997.

Tait, "The Extraction of Some Base Metal Ions By Cyanex 301, Cyanex 302 and Their Binary Extractant Mixtures With Aliquat 336," *Solvent Extraction and Ion Exchange*, vol. 10(5), 1992, pp. 799–809.

Elliott and Banks, "Tri–n–Octylphosphine Sulfide As Extractant," *Anal. Chim. Acta*, vol. 33, 1965, pp. 237–244.

Laintz, Wai, Yonker, and Smith, "Extraction of Metal Ions from Liquid and Solid Materials by Supercritical Carbon Dioxide," *Analytical Chemistry*, vol. 64, 1992, pp. 1575–1578.

Tait, "Cobalt–Nickel Separation: The Extraction of Cobalt (II) and Nickel (II) by Cyanex 301, Cyanex 302 and Cyanex 272," *Hydrometallurgy*, vol. 32, 1993, pp. 365–372.

(List continued on next page.)

*Primary Examiner*—Joseph W. Drodge
*Attorney, Agent, or Firm*—Klarquist Sparkman Campbell Leigh & Whinston LLP

[57] ABSTRACT

Methods for extracting metalloid and metal species from a solid or liquid material by exposing the material to a fluid solvent, particularly supercritical $CO_2$, and a chelating agent are described. The chelating agent forms a chelate with the species, the chelate being soluble in the fluid to allow removal of the species from the material. In preferred embodiments the extraction solvent is supercritical $CO_2$ and the chelating agent comprises an organophosphorous chelating agent, particularly sulfur-containing organophosphorous chelating agents, including mixtures of chelating agents. Examples of chelating agents include monothiophosphinic acid, di-thiophosphinic acid, phosphine sulfite, phosphorothioic acid, and mixtures thereof. The method provides an environmentally benign process for removing metal and metalloids from industrial waste solutions, particularly acidic solutions. Both the chelate and the supercritical fluid can be regenerated and the contaminant species recovered to provide an economic, efficient process.

40 Claims, 1 Drawing Sheet

OTHER PUBLICATIONS

Wai, Lin, Brauer, and Wang, "Supercritical Fluid Extraction of Organic and Inorganic Mercury From Solid Materials," *Talanta*, vol. 40, No. 9, 1993, pp. 1325–1330.

Lin, Brauer, Laintz, and Wai, "Supercritical Fluid Extraction of Lanthanides and Actinides from Solid Materials with a Fluorinated β–Diketone," *Anal. Chem.*, vol.65, 1993, pp. 2549–2551.

Liu, Lopez–Avila, and Alcaraz, "Determination of Organotin Compounds in Environmental Samples by Supercritical Fluid Extraction and Gas Chromatography with Atomic Emission Detection," *Journal of High Resolution Chromatography*, vol. 16, Feb. 1993, pp. 106–112.

Lopez–Avila, Alcaraz, Beckert, and Heithmar, "Determination of Metals in Solid Samples by Complexation–Supercritical Fluid Extraction and Gas Chromatography–Atomic Emission Detection," *Journal of Chromatographic Science*, vol. 31, Aug. 1993, pp. 310–316.

Oudsema and Poole, "Determination of an Organotin Stabilizer in a Rigid Poly(Vinyl Chloride) Plastic by On–Line Supercritical Fluid Extraction and Chromatography with Formic Acid Modified Carbon Dioxide and Flame Ionization Detection," *Journal of High Resolution Chromatography*, vol. 16, Mar. 1993, pp. 198–202.

Lin, Wal, Jean, and Braier, "Supercritical Fluid Extraction of Thorium and Uranium Ions from Solid and Liquid Materials with Fluorinated β–Diketones and Tributyl Phosphate," *Environ. Science Technol.*, vol. 28, No. 6, 1994, pp. 1190–1193.

Lin and Wal, "Supercritical Fluid Extraction of Lanthanides with Fluorinated β–Diketones and Tributyl Phosphate," *Anal. Chem.*, vol.66, 1994, pp. 1971–1975.

Lin, Smart and Wai, "Supercritical Fluid Extraction and Chromatography of Metal Chelates and Organometallic Compounds," *Trends in Analytical Chemistry*, vol.14, No. 3, 1995, pp. 123–133.

Zhu and Jiao, "The Extraction of Americium and Light Lanthanides by HDEHDTP and Cyanex 302," *Radiochim. Acta.* vol. 69, 1995, pp. 191–193.

Sole and Hiskey, "Solvent Extraction of Copper by Cyanex 272, Cyanex 302, and Cyanex 301," *Hydrometallurgy*, vol. 37, 1995, pp. 129–147.

Zhu, "The Separation of Americium from Light Lanthanides by Cyanex 301 Extraction," *Radiochim. Acta.*, vol. 68, 1995, pp. 95–98.

FLUID EXTRACTION USING CARBON DIOXIDE AND ORGANOPHOSPHORUS CHELATING AGENTS

ACKNOWLEDGEMENT OF GOVERNMENT SUPPORT

This invention was funded in part by the United States Department of Energy under Grant CC-S-588193-002-C; the United States government has certain rights in the invention.

FIELD OF THE INVENTION

This invention concerns methods and compositions for extracting metals and metalloids from media using organophosphorous and sulfur-containing organophosphorous chelating agents.

BACKGROUND OF THE INVENTION

Waste treatment and disposal is an important social and economic issue. Industries throughout the world spend large sums of money to reduce the biological hazards of environmental exposure to toxic substances. Extraction of heavy metal ions and metalloids from contaminated soils and acidic waste solutions are important in environmental waste management. Such contaminants may be removed from soils, for example, by treating the soil with an acid that dissolves the metals and metalloids. Acid dissolution is followed by selected precipitation, electrowinning, or solvent extraction. Acid dissolution often produces many bi-products that can create serious environmental problems in their own right.

An alternative detoxification process is to encapsulate contaminants in a container or in a soluble matrix that prevents their entry into the environment. This approach still requires storage of the bulky matrix, and does not allow regeneration or reuse of the potentially useful materials contained in the contaminants.

Current technology for the removal of heavy metals and metalloid contaminants from soil and waste solution relies on acid leaching and solvent extraction. Organic solvents that are commonly used for solvent extractions typically are flammable and toxic. Moreover, metal and metalloid contaminated waste solutions often are quite acidic, and may have pH values of less than 2. Metals and metalloids in acidic media have proven difficult to extract as many chelating agents used for extractions are unstable in acidic solution or are chemically unsuitable for extraction from acidic solution.

SUMMARY OF THE INVENTION

The present invention provides methods and compositions for extracting metals and metalloids from waste streams. The process of the present invention is particularly effective for extracting metal and metalloid species from acidic media. The extraction of metals and metalloids from acidic solutions is facilitated by the use of $CO_2$, particularly supercritical $CO_2$, and organophosphorus chelating agents. Working embodiments of the invention typically use supercritical $CO_2$ and sulfur-containing organophosphorous chelating agents. The organophosphorous chelating agents are quite stable in acidic solutions and provide effective extraction of the metal and metalloid species. Additionally, the present invention provides effective separation of precious metals from various industrial wastes, particularly acidic waste media. The sulfur-containing organophosphorous chelating agents are particularly useful for selective extraction of precious metals (such as, gold, platinum and palladium). This allows contaminated precious metals to be regenerated.

One embodiment of the method comprises exposing metal or metalloid species in acidic media to a fluid solvent, particularly a supercritical fluid solvent, and an organophosphorous chelating agent. Sulfur-containing organophosphorous chelating agents provide excellent extraction efficiencies. The acidic media is exposed to the fluid or supercritical fluid solvent and the chelating agent for a sufficient period of time to form a chelate between the metal or metalloid species and the chelating agent. The fluid or supercritical fluid is then removed from the media with the solubilized metal chelate dissolved therein. The metal or metalloid chelates may subsequently be precipitated from the fluid. This process effectively and efficiently removes metals and metalloids from acidic media without using environmentally harmful extraction solvents. Additionally, various precious metals may be selectively extracted utilizing organophosphorous chelators.

Suitable chelating agents of the present invention comprise organophosphorous compounds. Currently, the best results appear to be achieved when using sulfur-containing organophosphorous chelating agents, including, but not limited to, monothiophosphinic acids, dithiophosphinic acids, phosphine sulfides, phosphorothioic acids, and mixtures thereof.

DETAILED DESCRIPTION

The present invention is suitable for extracting many different metals and metalloids from liquids or solids (referred to herein as media or substrates) particularly where the liquids and solids are acidic (i.e., pH <7, and generally <2). A metal is an element that forms positive ions in solutions, and produces oxides that form hydroxides rather than acids with water. Metals include, without limitation, alkaline metals, alkali-earth metals, transition metals, noble metals (including the precious metals gold, platinum and silver), rare metals, rare-earth metals (lanthanides), actinides (including the transuranic metals), light metals, heavy metals, synthetic metals and radioactive metals. Metalloids are elements with both metallic and non-metallic properties, and include without limitation, arsenic, selenium and tellurium.

Specific examples are provided herein of methods for extracting various heavy metals, precious metals and metalloids from media, particularly acidic media. The present invention also provides specific examples of methods for extracting radioactive metals, such as uranium, from acidic solutions.

I. Extraction Fluids

Suitable fluids and/or supercritical fluids for use in the present invention include carbon dioxide, nitrogen, nitrous oxide, methane, ethylene, propane and propylene. Carbon dioxide has been found to be a particularly useful fluid for both subcritical and supercritical fluid extractions because of its moderate chemical constants ($T_c$=31° C., $P_c$=73 atm) and its inertness (i.e., it is non-explosive and thoroughly safe for extractions, even extractions performed at supercritical conditions). Carbon dioxide is also a preferred solvent because it is abundantly available and relatively inexpensive.

The conditions necessary to produce subcritical or supercritical carbon dioxide can be determined using a phase diagram for carbon dioxide. The conditions typically must be above the critical temperature and pressure for supercritical carbon dioxide, a particularly useful solvent in the present invention. However, virtually any conditions that are above the critical points are acceptable for producing a supercritical carbon dioxide fluid solvent useful for practicing the extraction process of the present invention.

The extraction fluids may be used either individually or in combinations, as mixed fluids or supercritical fluid solvents. Examples of other extraction fluids, and their critical temperature and pressure, are shown in the following Table I:

TABLE I

PHYSICAL PARAMETERS OF SELECTED SUPERCRITICAL FLUIDS*

| Fluid | Molecular Formula | $T_c$ (°C.) | $p_c$(atm) | $\rho_c$(g/ml) | $\rho 400_{atm}$** |
|---|---|---|---|---|---|
| Carbon dioxide | $CO_2$ | 31.1 | 72.9 | 0.47 | 0.96 |
| Nitrous oxide | $N_2O$ | 36.5 | 71.7 | 0.45 | 0.94 |
| Ammonia | $NH_3$ | 132.5 | 112.5 | 0.24 | 0.40 |
| η-Pentane | $C_5H_{12}$ | 196.6 | 33.3 | 0.23 | 0.51 |
| η-Butane | $C_4H_{10}$ | 152.0 | 37.5 | 0.23 | 0.50 |
| η-Propane | $C_3H_6$ | 96.8 | 42.0 | 0.22 | — |
| Sulfur hexafluoride | $SF_6$ | 45.5 | 37.1 | 0.74 | 1.61 |
| Xenon | Xe | 16.6 | 58.4 | 1.10 | 2.30 |
| Dichlorodifluoromethane | $CCl_2F_2$ | 111.8 | 40.7 | 0.56 | 1.12 |
| Trifluoromethane | $CHF_3$ | 25.9 | 46.9 | 0.52 | — |
| Methanol | $CH_3OH$ | 240.5 | 78.9 | 0.27 | — |
| Ethanol | $C_2H_5OH$ | 243.4 | 63.0 | 0.28 | — |
| Isopropanol | $C_3H_7OH$ | 235.3 | 47.0 | 0.27 | — |
| Diethyl ether | $(C_2H_{25})_2O$ | 193.6 | 36.3 | 0.27 | — |
| Water | $H_2O$ | 374.1 | 218.3 | | |

*data from Matheson Gas Data Book (1980) and CRC Handbook of Chemistry and Physics (CRC Press, Boca Raton, Florida 1984).
**$T_r = 1.03$ In addition, a modifying solvent (also referred to as a modifier) may be added to the extraction fluid, including supercritical fluids, to improve the solvent characteristics thereof. Currently, the most useful modifying solvents include water; organic solvents, such as the low to medium boiling point alcohols and esters, particularly the lower alkyl alcohols and the lower alkyl esters, such as methanol, ethanol, ethyl acetate and the like; and phosphate esters, particularly the lower alkyl phosphate esters, such as tributyl phosphate. The phosphate esters currently are a preferred class of modifiers.

The modifiers are used in combination with the extraction material in sufficient concentrations to enhance the solubility of the metal or metalloid species in the extracting material. With more specificity, but without limitation, the modifiers typically are added to the extraction materials at proportions of between about 0.1% to about 20.0% by weight. The modifiers are most typically not supercritical fluids at the disclosed operating conditions.

In one embodiment the chosen modifier, or mixture of modifiers, is combined with a supercritical fluid at the described proportions prior to feeding the supercritical fluid to the extraction vessel. Alternatively, the supercritical fluid may be fed to the extraction vessel without the modifier. The modifier is then introduced into the extraction vessel and thereby combined with the supercritical fluid.

II. Fluid Extraction Apparatus

Figure 1:
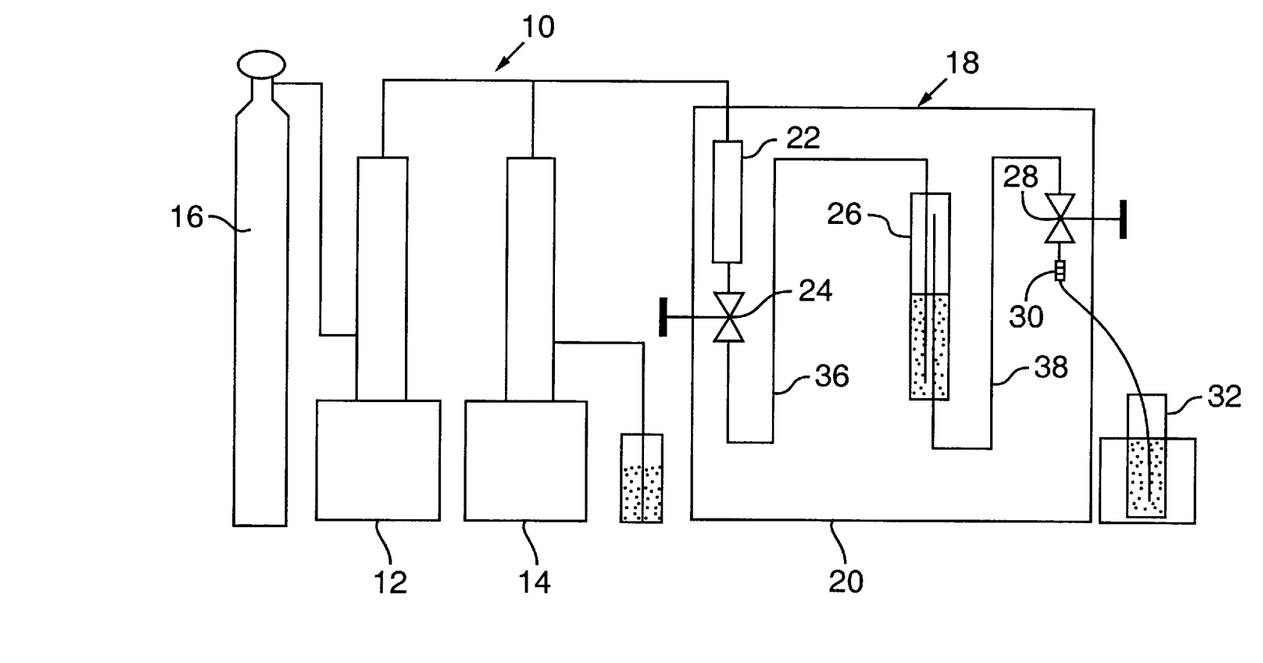
FIG. 1 is a schematic view of an extraction apparatus for extracting metals and metalloids from substrates in accordance with the present invention.

Fluid extraction according to the present invention can be both static and dynamic (i.e., continuous) although the currently preferred extraction method is dynamic. A proposed embodiment for a continuous chelation, supercritical-fluid extraction apparatus 10 is illustrated in FIG. 1. Two pumps 12, 14, preferably ISCO 260D syringe pumps (ISCO, Lincoln, Nebr.), and a customized supercritical extractor system 18 were employed. A supercritical fluid grade solvent (available from Scott Specialty Gases, Plumsteadville, Pa.) was supplied from cylinder 16 and was cooled by a coolant circulator (not shown) and delivered to the supercritical fluid extractor system 18 using syringe pump 12. A chelating agent was delivered by a syringe pump 14 and then mixed with the supercritical fluid with a T-junction. The supercritical fluid and chelating agent mixture was then flowed into the supercritical fluid extractor system 18.

One embodiment of the apparatus uses a supercritical fluid extractor system comprising a temperature controlled oven 20, a temperature equilibration device 22, an inlet valve 24, a liquid extraction vessel 26, an outlet valve 28, a pressure restrictor 30 and a collection vessel 32. A temperature equilibration device 22 having a volume of about 3.5 ml (available from Dionex; Sunnyvale, Calif.) also may be used.

The liquid extraction vessel 26 of the present invention was modified from a commercial supercritical fluid extraction cell (available from Dionex). The modified extraction cell had a 1.0 cm i.d., was 13 cm in length and had a volume of 10 ml. An inlet tube 36, preferably 1/16 in diameter, extended to the base of the extraction vessel 26 to allow the supercritical fluid to flow through the liquid extraction vessel from the base of the vessel to the top of the vessel. After flowing through the extraction vessel, the supercritical fluid flows out of the extraction vessel 26 through outlet tubing 38.

Liquid extraction vessel 26, outlet valve 28 and temperature equilibration device 22 were placed in the oven 20 with the temperature preferably being controlled to ±0.1° C. utilizing an Omega BS5001J1-A, bench top temperature controller (Stamford, Conn.). The extraction vessel 26 can be oriented either horizontally or vertically. Currently, the best results appear to be achieved when the vessel 26 and outlet valve 28 are placed in the oven 20 in a vertical orientation.

A fused-silica capillary tubing (preferably 50 um i.d.× 3.75 um o.d. and 40 cm in length; available from J&W Scientific; Folsum, Calif.) was used as the pressure restrictor 30 to maintain the extraction pressure. An inexpensive, robust, flexible and disposable restrictor was constructed by securing a fused-silica capillary restrictor inside a PEEK tube. For comparison, a commercial stainless steel restrictor obtained from ISCO and a bare fused-silica restrictor were also used. For the bare fused-silica restrictor, the capillary became brittle and usually broke after 40 minutes to 1 hour when polar $CO_2$-methanol (95:5) was continuously flowed through a liquid vessel containing 6 $\mu L$ water. The location of the break in the fused-silica restrictor occurred most frequently at a point outside the oven about 3–5 cm from the exit, likely due to the vibration of the restrictor caused by the expansion of depressurized $CO_2$. However, when the fused-silica restrictor was secured inside a PEEK tube, restrictor breakage due to polar fluids did not occur during a 6 hour test.

By comparison, the stainless steel restrictor was more robust and could be de-plugged by blowing hot air with a heat gun, a procedure which causes fused-silica restrictors to become brittle. Unfortunately, stainless steel restrictors are considerably more expensive than fused-silica restrictors. For safety reasons, the stainless steel restrictor is preferred when radioisotopes are used.

The flow rate of the supercritical fluid may vary depending upon the various factors, such as the materials being used. A working embodiment of the method and apparatus used a supercritical fluid flow rate of about 1.5 ml/min at 60° C. and 200° atm. The supercritical fluid extractor apparatus 10 used for many embodiments of the present invention allows both static (extraction vessel pressurized with supercritical fluid having no flow through the cell) and dynamic (supercritical fluid flow through the cell continuously) extraction to be carried out by the use of the outlet and inlet valves 24, 28.

Organophosphorous Chelating Agents

The supercritical fluid is used in combination with an organophosphorous chelating agent. Currently, the best results appear to be achieved when using sulfur-containing organophosphorous chelators. Working embodiments of the present invention obtained good extraction efficiencies using the sulfur-containing organophosphorous chelating agents shown below, which include without limitation, dithiophosphinic acids, monothiophosphinic acids, phosphine sulfides, phosphorothioic acids, and mixtures thereof. However, the chelating agent may be any sulfur-containing organophosphorous compound that forms a chelate with the metal or metalloid species being extracted, wherein the chelate so formed is soluble in the fluid or supercritical fluid solvent.

Suitable organophosphorous chelators are represented by the Formula I:

Formula I wherein X is selected from the group consisting of oxygen and sulfur, $R_1$–$R_3$ are independently selected from the group consisting of hydroxyl groups, sulfhydryl groups, lower alkyls, lower alkoxys, halogenated lower alkyls, halogenated lower alkoxys, lower thioalkyls, and mixtures thereof. As used herein, the term "lower alkyl" or "lower alkoxy" refers to compounds having ten or fewer carbon atoms, and includes both straight chain and branched chain compounds, as well as compounds having sites of unsaturation, such as double or triple bonds. As used herein, the term "halogenated" refers to compounds wherein at least one of the hydrogen atoms present on the alkyl or alkoxy group is replaced with a halogen atom, particularly fluorine.

Phosphinic acids are suitable for practicing the invention, particularly monophophinic acids. Suitable phosphinic acids are represented by Formula II:

Formula II wherein $R_4$ and $R_5$ are lower alkyls, lower alkoxys, halogenated lower alkyls, halogenated lower alkoxys, and mixtures thereof.

Suitable dithiophosphinic acids are represented by Formula III:

Formula III wherein $R_6$ and $R_7$ are independently selected from the group consisting of lower alkyls, lower alkoxys, halogenated lower alkyls, halogenated lower alkoxys, and mixtures thereof. Good results are achieved when the dithiophosphinic acid comprises di-trimethylpentyl dithiophosphinic acid. Working embodiments utilize di-2,4,4-trimethylpentyl dithiophosphinic acid.

Suitable monothiophosphinic acids are represented by Formula IV:

Formula IV wherein $R_8$ and $R_9$ are independently selected from the group consisting of lower alkyls, lower alkoxys, halogenated lower alkyls, halogenated lower alkoxys, and mixtures thereof. Good results are achieved when using di-trimethylpentyl monothiophosphinic acid. Working embodiments have used di-2,4,4-trimethylpentyl monothiophosphinic acid.

Suitable phosphine sulfides are represented by Formula V:

Formula V wherein $R_{10}$–$R_{12}$ are independently selected from the group consisting of lower alkyls, lower alkoxys, halogenated lower alkyls, halogenated lower alkoxys, and mixtures thereof. Good results are achieved when using tri-isobutyl phosphine sulfide.

Suitable phosphorothioic acids are represented by Formula VI:

Formula VI wherein $R_{13}$ and $R_{14}$ are independently selected from the group consisting of lower alkyls, lower alkoxys, halogenated lower alkyls, halogenated lower alkoxys, and mixtures thereof. Good results are achieved when using di-ethylhexyloxy phosphorothioic acid.

IV. Fluid Extraction Method

A fluid, particularly supercritical fluids such as those discussed above, is supplied to extraction vessel 26 from cylinder 16 (FIG. 1). Excellent results have been achieved when the fluid is supercritical $CO_2$. If the extraction fluid utilized is $CO_2$, the pressure of the carbon dioxide gas is preferably greater than about 73 atm and is at a temperature of greater than about 32° C. to form supercritical carbon dioxide, although other fluids and supercritical fluids give satisfactory extraction efficiencies.

An organophosphorous chelating agent is delivered by syringe pump 12 and mixed with the supercritical fluid either prior to, simultaneously with or subsequent to being combined with the media. Typically, the chelating agent is combined with the supercritical fluid prior to being combined with the media. In working embodiments of the present invention the organophosphorous chelating agent was diluted (1:1) with methanol. The chelating agent also may be diluted with solvents that are soluble in the extraction fluid. If the extraction fluid is $CO_2$, then the chelating agent may be combined with, for example, alcohols, halogenated hydrocarbons or low molecular weight liquids that are soluble in the supercritical $CO_2$.

In working embodiments of the present invention the supercritical fluid contains from 1% to about 10% (v/v), and typically from about 1% to about 5% (v/v), organophosphorous chelating agent. Currently, the best results appear to be achieved when the supercritical fluid contains about 3% (v/v) organophosphorous chelating agent.

The supercritical fluid and chelating agent are intimately mixed with the solid or liquid metal- or metalloid-containing acidic media in the extraction vessel. In working embodiments of the present invention, the supercritical fluid and chelating agent flow through the inlet tubing and into the base or bottom of the extraction vessel continuously for about 30 minutes, i.e., using a dynamic extraction process. Such a flow pattern allows the supercritical fluid and the chelating agent to intimately mix with the acidic media from the bottom to the top of the extraction vessel. During the dynamic extraction period, metal and/or metalloid chelates form, are extracted from the sample by the extraction fluid, and are allowed to flow out of the extraction vessel with the supercritical fluid stream. The metal and/or metalloid chelates are then collected in a collection vessel containing a suitable collection solvent. Suitable collection solvents include, but are not limited to, chloroform, methyl-isobutyl ketone, alcohols and halogenated hydrocarbons.

Particular working embodiments of the invention will be described in the following examples. The examples are exemplary only and should not be construed to limit the invention to the particular features discussed in the examples.

EXAMPLE I

All the experiments described herein were performed using the lab-built supercritical fluid extraction apparatus described above and shown in FIG. 1. This example concerns the extraction of Hg, Cu, Cd, Pb, Zn, As, Sb, Se and U ions from various acidic media. The acidic media tested included 0.1 molar hydrochloric acid (HCl), 1.0 molar HCl, 0.1 molar nitric acid ($HNO_3$), 1.0 molar $HNO_3$, 0.05 molar sulfuric acid ($H_2SO_4$) and 0.5 molar $H_2SO_4$ solutions. Each acidic solution extracted contained about 10 µg/ml metal or metalloid ion. Uranyl ion, U(VI), was prepared from analytical grade uranyl nitrate. All other metal solutions were prepared from AAS standard solutions.

The extractant fluid utilized in this example comprised supercritical $CO_2$. The chelating agent was di-2,4,4-trimethylpentyl dithiophosphinic acid, which was supplied by Cytec Industries of New Jersey and was used without further purification. The supercritical $CO_2$ was mixed with 3% (v/v) di-2,4,4-trimethylpentyl dithiophosphinic acid. Metal ions were chelated and extracted under dynamic conditions for 30 minutes. The supercritical conditions and extraction conditions, both, were 60° C. and 300 atm.

The extracted samples were analyzed utilizing a Perkin-Elmer Scienx ELAN 5000 Inductively Coupled Plasma Mass Spectrometer with a Gilson autosampler. The extraction efficiency was calculated by dividing the amount of metal ions remaining in the extraction vessel solution after the extraction process by the amount of metal ions present prior to the extraction.

The results of these extractions are presented below in Table II. Table II shows that sulfur-containing organophosphorous chelating agents provide a novel and efficient means for removing metal ions from acidic solutions, without using toxic or flammable organic chemicals for the extraction process. However, some metal ions in particular acidic media may require an alternative sulfur-containing organophosphorous chelating agent for extraction. More specifically, Table II shows the $Hg^{2+}$, $Cu^{2+}$, $Cd^{2+}$, $Pb^{2+}$, and $Se^{4+}$ ions were efficiently extracted (utilizing the dithiophosphinic acid in supercritical $CO_2$) from HCl, $H_2SO_4$, and $HNO_3$ solutions at both 0.1 and 1.0 molar concentrations. The results from this example also indicate that U(VI) may be efficiently extracted from different acidic solutions. There was a 50.3% extraction efficiency for the uranyl ion in 0.5 molar $H_2SO_4$. $Zn^{2+}$, $As^{3+}$, and $Sb^{3+}$ are efficiently extracted from both HCl and $H_2SO_4$ solutions. However, the extraction efficiencies for $Zn^{2+}$, $As^{3+}$ and $Sb^{3+}$ decrease to 90, 0 and 0, respectively, in 1.0 molar $HNO_3$ solutions.

Without being bound to any particular theory, the decrease in extraction efficiency of $Zn^{2+}$, $As^{3+}$, and $Sb^{3+}$ from 1.0 molar $HNO_3$ may be due to partial oxidation of the dithiophosphinic acid. The oxidation product of the chelating agent, extractant, probably would be (R)2-P(S)-S-S(S)P-(R)2, wherein R represents the R group of the dithiophosphinic acid utilized. The formation of this oxidation product reduces the concentration of chelating agent. Due to mutual competition for ligands of the chelating agent, the metal ions which have weaker interaction with the chelating agent (i.e., $As^{3+}$ $Sb^{3+}$ and $Zn^{2+}$) result in lower extraction efficiencies.

TABLE II

PERCENT EXTRACTION OF ELEMENTS FROM ACIDIC SOLUTION WITH SUPERCRITICAL $CO_2$ CONTAINING 3% (v/v) DI-2,4,4-TRIMETHYLPENTYL DITHIOPHOSPHINIC ACID AT 300 atm AND 60° C.

| Sample Matrix | Element** | | | | | | | | |
|---|---|---|---|---|---|---|---|---|---|
| | Hg | Cu | Cd | Pb | Zn | As | Sb | Se | U |
| 0.1M HCl | 100 | 98.4 | 100 | 100 | 93.0 | 95.8 | 100 | 100 | 100 |
| 1.0M HCl | 100 | 99.7 | 100 | 100 | 91.1 | 99.0 | 100 | 95.1 | 99.0 |
| 0.1M HNO3 | 100 | 99.3 | 100 | 99.9 | 93.7 | 94.1 | 100 | 99.1 | 100 |
| 1.0M HNO3 | 100 | 90.8 | 88.8 | 90.7 | 89.8 | 0 | 0 | 99.4 | 99.0 |
| 0.05M H2SO4 | 100 | 99.6 | 100 | 100 | 94.9 | 94.4 | 100 | 99.3 | 100 |
| 0.5M H2SO4 | 100 | 100 | 99.7 | 100 | 91.8 | 95.8 | 99.7 | 99.0 | 50.3 |

*30 min dynamic extraction
**Acidic solution contains 10 µg/ml of each element

EXAMPLE II

This example describes the extraction of Hg, Cu, Cd, Pb, Zn, As, Sb, Se and U from acidic media using supercritical $CO_2$ with monothiophosphinic acid as the chelating agent. The acidic media tested included 0.1 molar HCl, 1.0 molar HCl, 0.1 molar $HNO_3$, 1.0 molar $HNO_3$, 0.05 molar $H_2SO_4$ and 0.5 molar $H_2SO_4$ solutions. All metal and metalloid ions were extracted from acidic solutions containing 10 µg/ml of each ion. Uranyl ion was prepared from analytical grade uranyl nitrate. All other metal solutions were prepared from AAS standard solutions. The extraction method was identical to that described above in the described FLUID EXTRACTION METHOD.

The extractant fluid utilized in this example comprised supercritical $CO_2$ mixed with 3% (v/v) di-2,4,4-trimethylpentyl monothiophosphinic acid. The di-2,4,4-trimethylpentyl monothiophosphinic acid was supplied by Cytec Industries of New Jersey and was used without further purification. The metal ions were chelated and extracted under dynamic conditions for 30 minutes. The supercritical conditions and extraction conditions, both, were 60° C. and 300 atm. The extracted samples were analyzed as described above in Example I.

The results of this extraction procedure are provided below in Table III. The results of these extractions show that extraction with monothiophosphinic acid and supercritical $CO_2$ provides a novel and efficient means for removing metal and metalloid ions from acidic solutions. This method eliminates using toxic or flammable organic chemicals for the extraction process.

More specifically, the extraction efficiencies of Hg, Cu, Se and U are similar to those discussed above in Example I. However, the extraction efficiencies were slightly lower for Cd, Pb, Zn, As and Sb. It appears As and Sb may only be extracted from $HNO_3$ solutions when utilizing monothiophosphinic acids as shown above in Example I. The extraction of Hg, Cu, and Se provided excellent efficiencies in all acidic media tested. The extraction efficiency of Cd was extremely high although the extraction efficiency of 1.0 molar HCl solution was lower, at about 62.5%. The extraction of U resulted in excellent extraction efficiency in all acidic media tested, although the extraction efficiency in 0.5 molar $H_2SO_4$ decreased to about 46.8%. Extraction efficiency for Pb and Zn was nearly 100% in every acidic solution tested with the exception of 1 molar HCl and 1 molar $HNO_3$, wherein the efficiency was 51.5% and 53.1%, respectively. As and Sb were extracted at nearly 90% extraction efficiencies from 0.1 molar HCl utilizing the monothiophosphinic acid, with somewhat lower extraction efficiencies occurring from the 1.0 molar HCl solution.

TABLE III

PERCENT EXTRACTION OF ELEMENTS FROM ACIDIC SOLUTION WITH SUPERCRITICAL $CO_2$ CONTAINING 3% (v/v) DI-2,4,4-TRIMETHYLPENTYL MONOTHIOPHOSPHINIC ACID AT 300 atm AND 60° C.*

| Sample Matrix | Element** | | | | | | | | |
|---|---|---|---|---|---|---|---|---|---|
| | Hg | Cu | Cd | Pb | Zn | As | Sb | Se | U |
| 0.1M HCl | 100 | 94.4 | 100 | 100 | 93.8 | 97.0 | 100 | 99.4 | 99.3 |
| 1.0M HCl | 99.8 | 94.6 | 62.5 | 51.5 | 63.8 | 74.0 | 93.0 | 97.4 | 97.3 |
| 0.1M HNO3 | 100 | 99.1 | 100 | 98.7 | 92.0 | 0 | 12.6 | 99.1 | 98.8 |
| 1.0M HNO3 | 100 | 90.8 | 99.4 | 53.1 | 69.0 | 0 | 0 | 99.0 | 99.8 |
| 0.05M H2SO4 | 100 | 99.9 | 100 | 99.7 | 95.6 | 0 | 10.0 | 99.3 | 98.7 |
| 0.5M H2SO4 | 100 | 99.6 | 100 | 98.5 | 89.0 | 0 | 0 | 99.5 | 46.8 |

*30 min dynamic extraction
**acid solution contains 10 µg/ml of each element

EXAMPLE III

In a manner similar to that described above in Example II, Hg, Cu, Cd, Pb, Zn, As, Sb, Se and U were extracted from 0.1 molar HCl and 1.0 molar $HNO_3$ solutions utilizing supercritical $CO_2$ containing 3% (v/v) di-ethylhexyloxy phosphorothioic acid as the chelating agent. The di-ethylhexyloxy phosphorothioic acid was supplied by AG Bayer of Germany and was used without further purification. Each acidic solution contained about 10 µg/ml of each metal or metalloid ion. Uranyl ion was prepared from analytical grade uranyl nitrate. All other metal solutions were prepared from AAS standard solutions. The ions were complexed and extracted under dynamic conditions for 30 minutes. The supercritical conditions and extractant conditions were, both, 60° C. and 300 atm. The extracted samples were analyzed as described above.

The results provided in Table IV show that, with the exception of As and Sb, extraction efficiencies were extremely high for all metal and metalloid ions in HCl and $HNO_3$ using the phosphorothioic acid chelating agent with supercritical $CO_2$. Accordingly, extraction utilizing phosophorothioic acid proves to be a novel and efficient means for removing metal and metalloid ions from acidic solutions without using toxic or flammable organic chemicals for the extraction process.

TABLE IV

PERCENT EXTRACTION OF ELEMENTS FROM ACIDIC SOLUTION WITH SUPERCRITICAL $CO_2$ CONTAINING 3% (v/v) DI-ETHYLHEXYLOXY PHOSPHOROTHIOIC ACID AT 300 atm AND 60° C.

| Sample Matrix | Element** | | | | | | | | |
|---|---|---|---|---|---|---|---|---|---|
| | Hg | Cu | Cd | Pb | Zn | As | Sb | Se | U |
| 0.1M HCl | 100 | 98.8 | 99.1 | 98.9 | 97.5 | 0 | 4.4 | 99.2 | 99.8 |
| 1.0M HNO3 | 100 | 97.2 | 90.8 | 63.2 | 88.1 | 0 | 0 | 77.0 | 97.5 |

*30 min dynamic extraction
**acid solution contains 10 µg/ml of each element

EXAMPLE IV

This example concerns the extraction of precious metals from acidic solutions utilizing supercritical $CO_2$ containing 3% (v/v) dithiophosphinic acid. Specifically, the dithiophosphinic acid utilized was di-2,4,4-trimethylpentyl dithiophosphinic acid. The di-2,4,4-trimethylpentyl dithiophosphinic acid was supplied by Cytec Industries of New Jersey, and was used without further purification. The metal ions, specifically Au, Pt and Pd, were extracted in a manner similar to that described above in previous examples. The supercritical and extraction conditions were, both, 60° C. and 200 atm, with the samples being dynamically extracted for about 30 minutes. The acidic media tested were 0.1 molar HCl, 1.0 molar HCl, 0.1 molar $HNO_3$, 1.0 molar $HNO_3$, 0.05 molar $H_2SO_4$ and 0.5 molar $H_2SO_4$. All acidic solutions contained about 50 µg/ml of each precious metal ion. Metal solutions were prepared from AAS standard solutions. The extracted samples were analyzed as described above.

The results of this extraction procedure are provided below in Table V. More specifically, the precious metals gold, palladium and platinum were extracted at an efficiency level of 100% in all acidic solutions utilizing supercritical $CO_2$ containing dithiophosphinic acid with the exception of platinum in the 1 molar $HNO_3$ solution. The extraction efficiency of platinum in the 1 molar $HNO_3$ solution was lower, at 77.4%. Accordingly, it appears that at higher concentrations of nitric acid (1.0 molar) the extraction efficiency of $Pt^{4+}$ decreases. Without being bound to a particular theory, applicant suggests that the decrease of extraction efficiency is probably due to the partial oxidation of the chelating agent by the nitric acid, as discussed above. This example demonstrates that dithiophosphinic acid efficiently extracts metal and/or metalloid species from acidic solutions.

TABLE V

PERCENT EXTRACTION OF PRECIOUS METALS FROM ACIDIC SOLUTION WITH SUPERCRITICAL $CO_2$ CONTAINING 3% (v/v) DI-2,4,4-TRIMETHYLPENTYL DITHIOPHOSPHINIC ACID AT 200 atm AND 60° C.*

| | Element** | | |
|---|---|---|---|
| Sample Matrix | Au(III) | Pd(II) | Pt(IV) |
| 0.1M HCl | 100 | 100 | 100 |
| 1.0M HCl | 100 | 100 | 100 |
| 0.1M HNO3 | 100 | 100 | 100 |
| 1.0M HNO3 | 100 | 100 | 77.4 |
| 0.05M H2SO4 | 100 | 100 | 100 |
| 0.5M H2SO4 | 100 | 100 | 100 |

*30 min dynamic extraction
**acid solution contains 50 µg/ml of each metal ion

EXAMPLE V

In a manner similar to that described in the previous examples precious metals Au, Pd and Pt were extracted with supercritical $CO_2$ containing 3% (v/v) di-2,4,4-trimethylpentyl monothiophosphinic acid. The di-2,4,4-trimethylpentyl monothiophosphinic acid was supplied by Cytec Industries of New Jersey and was used without further purification. Both the extraction conditions and supercritical conditions were 60° C. and 200 atm. The ions were complexed and extracted under dynamic conditions for about 30 minutes. The precious metal ions were extracted from acidic solutions containing about 50 µg/ml of each metal ion. Metal solutions were prepared from AAS standard solutions. The following acidic solutions were tested for extraction efficiency using the monothiophosphinic acid chelating agent, 0.1 molar HCl, 1.0 molar HCl, 0.1 molar $HNO_3$, 1.0 molar $HNO_3$, 0.05 molar $H_2SO_4$ and 0.5 molar $H_2SO_4$. The extracted samples were analyzed as described above.

The results of this extraction procedure are provided in Table VI, illustrating that precious metals Au, Pd and Pt are efficiently extracted from acidic media utilizing the monothiophosphinic acid with the exception of Pt in a 1.0 molar $HNO_3$. More specifically, both the Au and Pd were extracted at 100% efficiency from all acidic solutions tested utilizing the monothiophosphinic acid. The $Pt^{4+}$ metal ion was extracted at efficiencies at or near 100% for all acidic solutions with the exception of the 1.0 molar $HNO_3$, wherein the extraction efficiency is still about 66%. Without being bound to a particular theory, applicant suggests that the decrease of extraction efficiency is probably due to the partial oxidation of the chelating agent by the nitric acid as discussed above.

TABLE VI

PERCENT EXTRACTION OF PRECIOUS METALS FROM ACIDIC SOLUTIONS WITH SUPERCRITICAL $CO_2$ CONTAINING 3% (v/v) DI-2,4,4-TRIMETHYLPENTYL MONOTHIOPHOSPHINIC ACID AT 200 atm AND 60° C.*

| | Element** | | |
|---|---|---|---|
| Sample Matrix | Au(III) | Pd(II) | Pt(IV) |
| 0.1M HCl | 100 | 100 | 100 |
| 1.0M HCl | 100 | 100 | 99.3 |
| 0.1M HNO3 | 100 | 100 | 99.8 |
| 1.0M HNO3 | 100 | 100 | 65.7 |
| 0.05M H2SO4 | 100 | 100 | 99.9 |
| 0.5M H2SO4 | 100 | 100 | 99.9 |

*30 min dynamic extraction
**acid solution contains 50 µg/ml of each metal ion

EXAMPLE VI

In a manner similar to that described in the previous examples, precious metals Au, Pd and Pt were extracted from substrates utilizing supercritical $CO_2$ containing 3% (v/v) di-ethylhexyloxy phosphorothioic acid as the chelating agent. The di-ethylhexyloxy phosphorothioic acid was supplied by AG Bayer of Germany and was used without further purification. The metal ions were extracted from 0.1 molar HCl, 1.0 molar HCl, 0.1 molar $HNO_3$, 1.0 molar $HNO_3$, 0.05 molar $H_2SO_4$ and 0.5 molar $H_2SO_4$ solutions. Each acidic solution contained about 50 µg/ml of each precious metal ion. Metal solutions were prepared from AAS standard solutions. The ions were complexed and extracted under dynamic conditions for about 30 minutes. The supercritical and extraction conditions were 60° C. and 200 atm. The extracted samples were analyzed as described above.

The results provided in Table VII show that all of the precious metals Au, Pd and Pt, are efficiently extracted from all acidic solutions utilizing the phosphorothioic acid with the exception of $Pt^{4+}$ in 1.0 molar $HNO_3$. More specifically, both the Au and Pd were extracted at 100% efficiency in all acidic media. The $Pt^{4+}$ ion was extracted at or near 100% efficiency from all acidic solutions with the exception of the 1.0 molar $HNO_3$ wherein the extraction efficiency was still about 61%. Without being bound to a particular theory, applicant suggests that the decrease in extraction efficiency is probably due to the partial oxidation of the chelating agent by the nitric acid, as discussed above.

The results of these extractions show that the phosphorothioic acid extraction of precious metals from varying acidic media provides a novel and efficient means for removing such ions from acidic solutions without using toxic or flammable organic chemicals for the extraction process.

TABLE VII

PERCENT EXTRACTION OF PRECIOUS METALS FROM ACIDIC SOLUTION WITH SUPERCRITICAL $CO_2$ CONTAINING 3% (v/v) DI-ETHYLHEXYLOXY PHOSPHOROTHIOIC ACID AT 200 atm AND 60° C.*

| | Element** | | |
|---|---|---|---|
| Sample Matrix | Au(III) | Pd(II) | Pt(IV) |
| 0.1M HCl | 100 | 100 | 100 |
| 1.0M HCl | 100 | 100 | 99.9 |

TABLE VII-continued

PERCENT EXTRACTION OF PRECIOUS METALS FROM ACIDIC
SOLUTION WITH SUPERCRITICAL $CO_2$ CONTAINING 3% (v/v)
DI-ETHYLHEXYLOXY PHOSPHOROTHIOIC ACID AT
200 atm AND 60° C.*

| Sample Matrix | Element** | | |
|---|---|---|---|
| | Au(III) | Pd(II) | Pt(IV) |
| 0.1M HNO3 | 100 | 100 | 100 |
| 1.0M HNO3 | 100 | 100 | 60.8 |
| 0.05M H2SO4 | 100 | 100 | 99.5 |
| 0.5M H2SO4 | 100 | 100 | 99.8 |

*30 min dynamic extraction
**acid solution contains 50 µg/ml of each metal ion

EXAMPLE VII

In a manner similar to that described in above examples, precious metals Au, Pd and Pt were extracted from acidic solutions utilizing supercritical $CO_2$ containing 3% tri-isobutyl phosphine sulfide chelating acid. The tri-isobutyl phosphine sulfide was supplied by Cytec Industries of New Jersey and was used without further purification. Acidic solutions 0.1 molar HCl, 1.0 molar HCl, 0.1 molar $HNO_3$, 1.0 molar $HNO_3$, 0.05 molar $H_2SO_4$ and 0.5 molar $H_2SO_4$ each contained about 50 µg/ml of each metal ion. Metal solutions were prepared from AAS standard solutions. The same precious metal ions were also extracted from 0.1 molar HCl and 1.0 molar HCl utilizing supercritical $CO_2$ containing 3% (v/v) di-2,4,4 trimethylpentyl phosphinic acid chelating agent. The metal ions were complexed and extracted under dynamic conditions for about 30 minutes. The supercritical and extraction conditions were 60° C. and 200 atm.

The results provided in Table VIII show that all of the precious metals tested were extracted at or near 100% efficiency from all acidic media when utilizing the tri-isobutyl phosphine sulfide chelating agent. The extraction efficiencies when utilizing the di-2,4,4 trimethylpentyl phosphinic acid for both $Pd^{2+}$ and $Pt^{2+}$ provided a slightly lower extraction efficiency of 82.2% and 94.0%, respectively, when extracting from the 1.0 molar HCl. Extraction of the $Au^{3+}$ in both acidic media tested was at 100%. The extraction of the $Pd^{2+}$ and $Pt^{4+}$ in 0.1 molar HCl was at 100% efficiency. The extraction efficiency in 1.0 molar HCl is lower than those of other sulfur-containing organophosphorous chelating agents. Without being bound to a particular theory, this may be because the phosphinic acid is a relatively weak acid compared with the acids tested in previous examples. Additionally, a lower extraction efficiency may be due to the relatively weak metal-chelator interaction of the phosphinic acid compared with sulfur-containing chelating agents based on the Lewis hard-soft, acid-base concept. Accordingly, this example illustrates that excellent extraction efficiency of precious metal ions from acidic solutions may be obtained when using sulfur-containing organophosphorous chelator agents and satisfactory extraction results for the phosphinic acid.

TABLE VIII

PERCENT EXTRACTION OF PRECIOUS METALS FROM ACIDIC
SOLUTION WITH SUPERCRITICAL $CO_2$ CONTAINING 3% (v/v)
TRI-ISOBUTYL PHOSPHINE SULFIDE
OR DI-2,4,4-TRIMETHYLPENTYL PHOSPHINIC ACID AT
200 atm AND 60° C.*

| Sample Matrix | Element** | | |
|---|---|---|---|
| | Au(III) | Pd(II) | Pt(IV) |
| TRI-IOSBUTYL PHOSPHINE SULFIDE | | | |
| 0.1M HCl | 100 | 100 | 100 |
| 1.0M HCl | 100 | 100 | 100 |
| 0.1M HNO3 | 100 | 100 | 100 |
| 1.0M HNO3 | 100 | 100 | 95.2 |
| 0.05M H2SO4 | 100 | 100 | 100 |
| 0.5M H2SO4 | 100 | 100 | 97.8 |
| DI-2,4,4 TRIMETHYLPENTYL PHOSPHINIC ACID | | | |
| 0.1M HCl | 100 | 100 | 100 |
| 1.0M HCl | 100 | 82.2 | 94.0 |

*30 min dynamic extraction
**acid solution contains 50 µg/ml of each metal ion

EXAMPLE VIII

To illustrate that organophosphine sulfides also are selective chelating agents for gold and palladium, $Au^{3+}$ was extracted in this example utilizing supercritical $CO_2$ containing 3% (v/v) di-ethylhexyl phosphorothioic acid as the chelating agent. In this example the extraction of gold from industrial electronic boards is demonstrated. Gold in the electronic board was first dissolved utilizing an HCl solution, at a pH of about 0.7. The acidic solutions contained approximately 400 µg/ml of the gold ion. Gold solutions were prepared from AAS standard solutions. The gold ions were complexed and extracted under dynamic conditions for approximately 30 minutes. The supercritical conditions and the extraction conditions were 60° C. and 200 atm.

The results provided in Table IX illustrate that gold ions from industrial electronic boards are efficiently extracted from acidic solution using this novel chelating/supercritical fluid extraction technology. More specifically, the gold ion was extracted from the acidic media at a 100% efficiency for both samples. Accordingly, this example illustrates that sulfur-containing organophosphorous chelating agents may be utilized to efficiently extract gold and reclaim the gold from industrial electronic boards, and other industrial uses, without utilizing toxic or flammable organic chemicals for the extraction process.

TABLE IX

EXTRACTION OF AU IN ACIDIC SOLUTION FROM
ELECTRONIC BOARD WITH SUPERCRITICAL $CO_2$
CONTAINING 3% (v/v) DI-ETHYLHEXYLOXY
PHOSPHOROTHIOIC ACID AT 200 atm AND 60° C.

| Sample Matrix | Au Conc. (ppm) | Percent Extraction |
|---|---|---|
| HCl pH = 0.7 | 398 | 100 |
| HCl pH = 0.7 | 384 | 100 |

The present invention illustrates that metals and metalloids may be extracted from industrial wastes and, in particular, from acidic media utilizing organophosphorous chelating agents in supercritical $CO_2$. The present invention illustrates that sulfur-containing organophosphorous chelation agents provide exceptional extraction efficiencies for many metal and metalloid species in acidic or non-acidic media. The extraction process may be extended to industrial-scale extraction for the treatment of acidic liquid waste, and to the extraction of valuable metals from mineral materials and waste industrial electronic materials, while minimizing the production of secondary waste.

Having illustrated and described the principles of the invention and several preferred embodiments, it should be apparent to those skilled in the art that the invention can be modified in arrangement and detail without departing from such principles. We claim all the modifications coming within the spirit and scope of the following claims.

We claim:

1. A method for extracting metal and/or metalloid species from a solid or liquid media comprising exposing the media to carbon dioxide and a chelating agent represented by the formula wherein X is sulfur and $R_1$–$R_3$ are independently selected from the group consisting of hydroxyls, sulfhydryls, lower alkyls, lower alkoxys, halogenated lower alkyls, halogenated lower alkoxys, and mixtures thereof, the chelating agent forming chelates with the species, the chelates being soluble in the carbon dioxide the chelating agent not comprising a phosphine sulfide.

2. The method according to claim 1 wherein the carbon dioxide is subcritical.

3. The method according to claim 1 wherein the carbon dioxide is supercritical.

4. The method according to claim 1 wherein at least one of $R_1$–$R_3$ is a sulfhydryl.

5. The method according to claim 4 wherein two of $R_1$–$R_3$ are lower alkyls.

6. The method according to claim 5 wherein the alkyl groups each have carbon chain lengths of from about two carbon atoms to about eight carbon atoms.

7. The method according to claim 5 wherein the alkyl groups are the same.

8. The method according to claim 7 wherein the alkyl groups are trimethylpentyl.

9. The method according to claim 1 wherein at least one of $R_1$–$R_3$ is a hydroxyl.

10. The method according to claim 9 wherein two of $R_1$–$R_3$ are lower alkyls.

11. The method according to claim 10 wherein the alkyl groups each have carbon chain lengths of from about two carbon atoms to about eight carbon atoms.

12. The method according to claim 10 wherein the alkyl groups are the same.

13. The method according to claim 12 wherein $R_2$ and $R_3$ are trimethylpentyl.

14. The method according to claim 10 wherein the alkyl groups are the same.

15. The method according to claim 14 wherein the alkyl groups are isobutyl.

16. The method according to claim 1 wherein two of $R_1$–$R_3$ are lower alkyls.

17. The method according to claim 16 wherein the lower alkyl groups each have carbon chain lengths of from about two carbon atoms to about eight carbon atoms.

18. The method according to claim 16 wherein the alkyl groups are the same.

19. The method according to claim 18 wherein the alkyl groups are trimethylpentyl.

20. The method according to claim 18 wherein the alkyl groups are 2,4,4-trimethylpentyl.

21. The method according to claim 1 wherein two of $R_1$–$R_3$ are lower alkoxy.

22. The method according to claim 21 wherein the alkyl groups each have carbon chain lengths of from about two carbon atoms to about eight carbon atoms.

23. The method according to claim 1 wherein $R_1$–$R_3$ are lower alkyls.

24. The method according to claim 23 wherein $R_1$–$R_3$ each have carbon chain lengths of from about two carbon atoms to about eight carbon atoms.

25. The method according to claim 1 wherein $R_1$=$R_2$=$R_3$.

26. The method according to claim 25 wherein $R_1$–$R_3$ are isobutyl.

27. The method according to claim 1 wherein the chelating agent is selected from the group consisting of monothiophosphinic acids, dithiophosphinic acids, phosphorothioic acids, and mixtures thereof.

28. The method of claim 1 wherein the metal or metalloid species is extracted from an acidic media.

29. The method of claim 1 wherein the exposing step comprises continuously flowing supercritical carbon dioxide through the solid or liquid.

30. The method according to claim 1 and further comprising adding a modifying solvent to the carbon dioxide, wherein the modifying solvent is selected from the group consisting of water, lower alkyl alcohols, lower alkyl esters, phosphate esters, and mixtures thereof.

31. A method for extracting metal or metalloid species from a liquid or solid media comprising exposing the media to supercritical carbon dioxide containing an organophosphorus chelating agent selected from the group consisting of monothiophosphinic acids, dithiophosphinic acids, phosphorothioic acids, and mixtures thereof, at least one of the chelating agents forming chelates with the species, the chelates being soluble in the carbon dioxide.

32. The method of claim 31 wherein the dithiophosphinic acid chelating agents are represented by the formula wherein $R_6$ and $R_7$ are independently selected from the group consisting of lower alkyls, lower alkoxys, halogenated lower alkyls, halogenated lower alkoxys, and mixtures thereof, and wherein the monothiophosphinic acid chelating agents are represented by the formula wherein $R_8$ and $R_9$ are independently selected from the group consisting of lower alkyls, lower alkoxys, halogenated lower alkyls, halogenated lower alkoxys, and mixtures thereof, and wherein the phosphorothioic acid chelating agents are represented by the formula wherein $R_{13}$ and $R_{14}$ are independently selected from the group consisting of lower alkyls, lower alkoxys, halogenated lower alkyls, halogenated lower alkoxys, and mixtures thereof.

33. The method according to claim 32 wherein $R_6=R_7$, $R_8=R_9$, and $R_{13}=R_{14}$.

34. The method according to claim 32 wherein $R_6$–$R_9$, $R_{13}$ and $R_{14}$ each have carbon chain lengths of from about two carbon atoms to about eight carbon atoms.

35. The method according to claim 21 wherein the metal or metalloid species is extracted from an aqueous acidic solution.

36. The method according to claim 31 and further comprising adding a modifying solvent to the carbon dioxide, wherein the modifying solvent is selected from the group consisting of water, lower alkyl alcohols, lower alkyl esters, phosphate esters, and mixtures thereof.

37. A method for treating material containing metalloid and metal species, comprising the steps of:
    providing a container of the material;
    exposing the material in the container to supercritical carbon dioxide containing a chelating agent selected from the group consisting of monothiophosphinic acids, dithiophosphinic acids, phosphorothioic acids, and mixtures thereof, at least one of the chelating agents forming chelates with the species, the chelates being soluble in the carbon dioxide; and
    removing the carbon dioxide and solubilized species from the container.

38. A method for extracting metal and/or metalloid species from a solid or liquid media comprising exposing the media to carbon dioxide and a chelating agent represented by the formula and wherein X is selected from the group consisting of oxygen and sulfur, and wherein $R_{15}R_{17}$ are independently selected from the group consisting of hydroxyls, sulfhydryls, lower alkyls, lower alkoxys, halogenated lower alkyls, halogenated lower alkoxys, and mixtures thereof, such that (a) when $R_{15}$ and $R_{16}$ are lower alkyls, $R_{17}$ is selected from the group consisting of sulfhydryls, lower alkoxys, halogenated lower alkyls, halogenated lower alkoxys, and mixtures thereof, and (b) when $R_{15}$ and $R_{16}$ are lower alkoxys, $R_{17}$ is selected from the group consisting of hydroxyls, sulfhydryls, lower alkyls, halogenated lower alkyls, halogenated lower alkoxys, and mixtures thereof, and (c) when $R_{15}$ is a hydroxyl, $R_{16}$ and $R_{17}$ are selected from the group consisting of hydroxyls, sulfhydryls, lower alkoxys, halogenated lower alkyls, halogenated lower alkoxys, and mixtures thereof, and (d) when $R_{15}$ is a lower alkyl or a halogenated lower alkyl and $R_{16}$ is a hydroxyl, $R_{17}$ is selected from the group consisting of hydroxyls, sulfhydryls, lower alkoxys, halogenated lower alkoxys, and mixtures thereof; and wherein the chelating agent forms chelates with the species, the chelates being soluble in carbon dioxide the chelating agent not comprising a phosphine sulfide.

39. The method of claim 38 wherein the carbon dioxide is subcritical.

40. The method of claim 38 wherein the carbon dioxide is supercritical.

* * * * *